United States Patent
Klopp et al.

(10) Patent No.: US 6,794,504 B2
(45) Date of Patent: Sep. 21, 2004

(54) CHLORINATED COPPER PHTHALOCYANINE PIGMENTS

(75) Inventors: Ingo Klopp, Weisenheim (DE); Josef Hetzenegger, Birkenheide (DE); Peter Böttcher, Carlsberg (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/239,203

(22) PCT Filed: Apr. 3, 2001

(86) PCT No.: PCT/EP01/03775

§ 371 (c)(1),
(2), (4) Date: Sep. 27, 2002

(87) PCT Pub. No.: WO01/77231

PCT Pub. Date: Oct. 18, 2001

(65) Prior Publication Data

US 2003/0088091 A1 May 8, 2003

(30) Foreign Application Priority Data

Apr. 7, 2000 (DE) .......................... 100 16 993

(51) Int. Cl.$^7$ ............................. C07D 487/22
(52) U.S. Cl. ...................... 540/136; 540/137; 540/138
(58) Field of Search .................. 540/136, 137, 540/138

(56) References Cited

U.S. PATENT DOCUMENTS 3,004,986 A    10/1961   Kirby et al. ............. 260/314.5

FOREIGN PATENT DOCUMENTS

| | | |
|---|---|---|
| DE | 11 43 176 | 12/1967 |
| DE | 15 69 639 | 5/1970 |
| EP | 0 182 207 | 5/1986 |
| EP | 0 621 306 | 10/1994 |
| EP | 0 909 795 | 4/1999 |
| FR | 1 441 088 | 8/1966 |
| GB | 891 736 | 3/1962 |
| JP | 2124-039 | 10/1977 |
| JP | 3121-845 | 10/1978 |
| JP | 8023-840 | 2/1983 |

*Primary Examiner*—Richard L. Raymond
(74) *Attorney, Agent, or Firm*—Oblon, Spivak, McClelland, Maier & Neustadt, P.C.

(57) ABSTRACT

Incipiently chlorinated copper phthalocyanine pigments having a chlorine content of from 10 to 40% by weight and a dispersion harshness $\leq 10$ in LDPE are useful for coloring plastics.

11 Claims, No Drawings

CHLORINATED COPPER PHTHALOCYANINE PIGMENTS

This application is a 371 of PCT/EP01/03775, filed Apr. 3, 2001.

The present invention relates to novel incipiently chlorinated copper phthalocyanine pigments having a chlorine content of 10 to 40% by weight that are characterized by a dispersion harshness ≦10 in LDPE.

The invention also relates to the preparation of these pigments and to their use for warp-free coloration of plastics.

As-synthesized organic pigments are generally not suitable for further use. Various methods have therefore been developed to transform these amorphous to microcrystalline crude pigments into a useful pigmentary state.

EP-A-909 795 discloses treating incipiently chlorinated (blue) copper phthalocyanine pigments with acidic aromatic organic solvents, such as nitrophenol and naphthol, at around 100° C. The essential feature of this process is the presence of separately prepared pigment derivatives. However, the pigments obtained in this process are difficult to incorporate into plastics because of their dispersion harshness.

DE-C-12 42 180 discloses thermally treating polyhalogenated (green) copper phthalocyanine pigments having a halogen content of not less than 49.5% by weight in nitrophenol at around 135° C. DE-C-15 69 639 discloses thermally treating polyhalogenated copper phthalocyanine pigments having a halogen content of not less than 48.4% by weight in naphthol at around 100° C. The two processes are carried out in an open system without further additives. As comparative experiments in EP-A-909 795 show for incipiently chlorinated copper phthalocyanine pigments, however, the solvent treatment at 100° C. in the absence of the pigment derivatives leads to weaker, dull pigments.

Organic pigments for plastics coloration have to have a number of properties. As well as the aforementioned dispersion softness, ie. ease of incorporation into plastics, high color strength and high fastnesses (eg. weather-, light- and migrationfastness) are essential properties. A further particular requirement relates to the coloration of high-volume injection moldings. This is where warping is a common recurrence. As the molding cools, it undergoes differential shrinkage in the various dimensions, which causes the molding to deform and can render it unusable. Warpage is caused by the presence of the pigment, which disrupts the crystallization of the plastic.

To counteract warp problems, various methods have been proposed for modifying the surface of the organic pigment. For instance, EP-A-621 306 describes a treatment with a low-temperature plasma. JP-A-124 039/1977, 121 845/1978 and 023 840/1983 derivatize copper phthalocyanine pigments for this purpose.

However, these methods are disadvantageous in that they are technically complicated or require the additional synthesis of pigment derivatives.

It is an object of the present invention to provide strong blue copper phthalocyanine pigments for warp-free coloration of plastics.

We have found that this object is achieved by incipiently chlorinated copper phthalocyanine pigments having a chlorine content of from 10 to 40% by weight that are characterized by a dispersion harshness ≦10 in LDPE.

The invention also provides a process for preparing these pigments, which comprises isolating as a water-moist filter cake the crude pigment obtained in the chlorination of copper phthalocyanine, optionally drying the crude pigment, mixing the water-moist or dried crude pigment with an acidic aromatic organic medium and heating this mixture in a closed system to 140–200° C. at from 1 to 7 bar and subsequently isolating the treated pigment in a conventional manner.

The invention lastly provides for the use of the pigments according to the invention for warp-free coloration of plastics.

The incipiently chlorinated copper phthalocyanine pigments of the invention have a chlorine content of from 10 to 40% by weight (which corresponds to about 2–10 chlorine atoms per molecule), preferably of from 10 to 30% by weight (which corresponds to about 2–6 chlorine atoms), particularly preferably of from 10 to 20% by weight (which corresponds to about 2–4 chlorine atoms).

They are notable for their color properties, especially their high color strength and brilliance, in particular also for their dispersion softness. Their dispersion harshness in LDPE (customary molecular weight range from 20,000 to 50,000, customary density range from 0.910 to 0.935 g/cm$^3$) is ≦10.

They also provide warp-free coloration of plastics, which was unforeseeable, since dispersion softness and distortion resistance are contrary properties in that dispersion softness increases with increasing primary particle size, while distortion resistance usually decreases with increasing primary particle size, since larger pigment crystals cause more severe disruption to the crystallization of the plastic.

The pigments of the invention are advantageously obtainable by the process according to the invention.

The starting material is a crude pigment obtained by generally known chlorination of copper phthalocyanine. The reaction is preferably carried out with chlorine in a molten salt which generally includes aluminum chloride, for example an aluminum chloride/titanium tetrachloride melt and preferably an aluminum chloride/sodium chloride melt, or in chlorosulfonic acid, in which case the copper phthalocyanine used is preferably chlorine free, but may also already contain small amounts of chlorine (customarily<6% by weight). The copper phthalocyanine itself may have been prepared for example by reacting phthalic anhydride with urea or by cyclizing o-phthalonitrile, in either case in the presence of copper or copper salts.

The incipiently chlorinated crude pigment is customarily isolated by discharging the chlorination batch onto water and then filtering. Generally the filter cake obtained is washed with an aqueous inorganic base, eg. sodium hydroxide solution, to remove salt and residual acid.

The process of the invention subjects the incipiently chlorinated crude pigment to a hot treatment with an acidic aromatic organic medium. For this the crude pigment can be used after drying or advantageously as a water-moist filter cake.

The acidic aromatic organic medium is preferably a compound of the general formula I

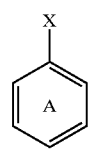

I where

X is hydroxyl or carboxyl. The benzene ring A may be substituted and/or benzofused; that is, preference is given to using phenol, substituted phenols, naphthols, substituted naphthols, benzoic acid, substituted benzoic acids, naphthoic acids and substituted naphthoic acids as the acidic organic medium.

The benzene ring A may bear up to 2 identical or different substituents selected from the group consisting of nitro, $C_1$–$C_4$-alkyl, preferably $C_1$–$C_2$-alkyl, $C_2$–$C_4$-alkenyl, preferably $C_2$–$C_3$-alkenyl, chlorine, bromine and carboxyl.

When X is carboxyl, the benzene ring A is preferably substituted by $C_{1-C4}$-alkyl or is unsubstituted.

When X is hydroxyl, the benzene ring A is preferably substituted by nitro.

Benzofused benzene rings A preferably bear no further substituents.

It will be appreciated that mixtures of different acidic organic compounds may also be used.

Examples of suitable acidic aromatic organic media are phenol, 2-, 3- and 4-nitrophenol, 2-, 3- and 4-methylphenol, 2-, 3- and 4-ethylphenol, 2-allylphenol, 2-, 3- and 4-bromophenol, 2,4-dibromophenol, 2,4-dichlorophenol, 2-chloro-6-nitrophenol, 2-chloro-4-nitrophenol, 2,4-dinitrophenol, 3-methyl-4-nitrophenol, 1- and 2-naphthol, 1-bromo-2-naphthol, benzoic acid, 2-, 3- and 4-methylbenzoic acid, 2-, 3- and 4-ethylbenzoic acid and 1- and 2-naphthoic acid, of which 1- and 2-naphthol are preferred and 2-nitrophenol is particularly preferred.

The amount of acidic organic medium used per g of crude pigment is generally in the range from 1 to 10 g, preferably in the range from 1.5 to 2.5 g. It will be appreciated that larger amounts of acidic medium could be used as well, although this would be uneconomical. In the case of smaller amounts of acidic medium, the mixture can be difficult to stir.

As mentioned above, the crude pigment may advantageously be used as a water-moist filter cake, which generally should have a water content of from 50 to 90% by weight. This not only saves a drying operation, but also improves the stirability of the mixture. However, an overlarge excess of water should be avoided in order that the space-time yield may not be unnecessarily depressed. It is therefore particularly favorable to use a weight ratio of from about 3:1 to 5:1 for water to crude pigment, and this weight ratio may if necessary also be set by addition of more water.

The inventive treatment of the crude pigment with the acidic organic medium is carried out at from 140 to 200° C., preferably at from 140 to 160° C.

Generally the thermal treatment takes from 1 to 12 h, preferably from 1 to 8 h, particularly preferably from 3 to 7 h.

The thermal treatment is carried out in a closed system. It is customary to operate under the resulting autogenous pressure, and this is the case in the presence of water especially. If desired, it is also possible to impress a higher pressure or in fact any pressure. Customary pressure ranges extend from 1 to 7 bar.

The treated pigment is advantageously isolated as follows:

The mixture is cooled down to about 50–100° C. and aqueous base, especially a dilute alkali metal hydroxide solution, is added to convert the acidic aromatic organic medium into a water-soluble salt which is separated from the pigment in the subsequent filtration and can be advantageously separated from the alkaline filtrate by acidification and recycled back into the process. The pigment is then washed, dried and ground.

If desired, the pigment may be subjected to an additional alkaline aftertreatment prior to drying to effect complete removal of the acidic medium by stirring up the filter cake at from room temperature to 120° C. in a dilute base, preferably in a dilute alkali metal hydroxide solution, under the resulting autogenous pressure for about 2–6 h.

The incipiently chlorinated copper phthalocyanine pigments of the invention are very useful for coloring plastics. Polyolefins, such as polyethylene (HDPE, MDPE, LDPE) and polypropylene, and also polyamide (PA) can be colored without warping.

EXAMPLES

Preparation and testing of incipiently chlorinated copper phthalocyanine pigments according to invention Examples 1 to 6

A mixture of a g of a crude incipiently chlorinated copper phthalocyanine pigment (R) having a chlorine content of x% by weight and a water content of y% by weight (isolated as a moist filter cake (or dried in Examples 5 and 6) by chlorination of copper phthalocyanine in an aluminum chloride/sodium chloride melt, precipitation of the chlorination product in water, washing with water and dilute sodium hydroxide solution), b g of water and 200 g of 2-nitrophenol (oNP) was heated in a pressure tightly sealed reactor at a pressure of d bar to $T_1°$ C. for $t_1$ h.

After cooling to 80° C. and opening the reactor, the mixture was adjusted with 50% by weight sodium hydroxide solution to an alkaline pH (pH>11) to dissolve out the 2-nitrophenol and filtered.

The filtered and water-washed pigment was mixed with 2% by weight (Example 6:1% weight) sodium hydroxide solution and heated at $T_2°$ C. under the respective autogenous pressure for $t_2$ h to dissolve out residual 2-nitrophenol.

The pigment was then filtered off, washed with water, dried and ground in a Retsch ZM 100 ultracentrifugal mill at 15,000 rpm for about 10 s.

The pigments obtained were incorporated into LD polyethylene to evaluate their color properties and their dispersion harshness.

To this end, 80 g of a basic white mix consisting of a preextruded mixture of 5 g of titanium dioxide (Kronos 2220), 2.5 g of Lupolen® 1800 S powder (density 0.917 g/cm³, melt index MFR (190/2.16) 17–22) and 92.5 g of Lupolen 1812 E pellet (density 0.920 g/cm³, melt index MFR (190/2.16) 0.5) with 0.4 g of the in-test pigment were processed on mixing rolls at a roll temperature of 160° C. with 200 roll revolutions into a sheet 0.4 mm in thickness. The sheet was halved, and one half was subjected to a further 200 roll revolutions at a roll temperature of 130° C. The sheet was 0.3 mm thick. The two sheets were each divided and molded in a spacer frame press at 160° C. for 1 min to form plates. The plates were then calorimetrically evaluated according to the CIELAB formula (DIN 6174) using the standard illuminant D65.

The crude pigment (V) which had not been treated with 2-nitrophenol, only ground, was used as standard (hue angle H=237.6°; chroma C*=37.1; FAE value (coloring equivalents)=100). FAE values<100 indicate a higher color strength than the standard, FAE values>100 correspondingly a lower color strength. Dispersion harshness (DH) was calculated by the following formula from the measured lightening ratios:

$$DH = \left[\frac{AV1}{AV2} - 1\right] * 100$$

AV1=lightening ratio of coloration produced at 130° C.
AV2=lightening ratio of coloration produced at 160° C.

LDPE bottle crates colored with the incipiently chlorinated copper phthalocyanine pigments of the invention were free of distortion.

Further details concerning these experiments and their results are summarized in the table below. The table also lists for comparison the crude pigment not treated with 2-nitrophenol (Example V) and the crude pigment treated with 2-nitrophenol at 100° C. similarly to EP-A-909 795 (Example V1).

TABLE

| Ex. | a g of R | x % by weight of Cl | y % by weight of H$_2$O | b g of H$_2$O | d bar | T$_1$ °C | t$_1$ h | T$_2$ °C | t$_2$ h | Yield g | FAE | ΔH | ΔC* | DH |
|---|---|---|---|---|---|---|---|---|---|---|---|---|---|---|
| 1 | 391 | 16.8 | 74.4 | 109 | 4.2 | 150 | 2 | 80 | 1 | 96 | 91 | −0.5 | +0.5 | 8 |
| 2 | 391 | 16.8 | 74.4 | 109 | 4.2 | 150 | 5 | 80 | 4 | 97 | 85 | −0.3 | +0.5 | 9 |
| 3 | 391 | 16.8 | 74.4 | 109 | 4.2 | 150 | 6 | 120 | 1 | 97 | 83 | 0.2 | +1.3 | 6 |
| 4 | 391 | 16.8 | 74.4 | 109 | 4.2 | 150 | 6 | — | — | 96 | 83 | −0.7 | +1.1 | 4 |
| 5 | 100 | 17.0 | — | 400 | 4.3 | 150 | 6 | 30 | 1 | 96 | 84 | −0.2 | +0.0 | 6 |
| 6 | 100 | 17.0 | — | 400 | 4.3 | 150 | 6 | 120 | 1 | 95 | 87 | +0.1 | +1.1 | 6 |
| V | — | 17.0 | — | — | — | — | — | — | — | 100 | 100 | 0 | 0 | 41 |
| V1 | 391 | 16.8 | 74.4 | 109 | — | 100 | 5 | — | — | 96 | 100 | −1.0 | −0.9 | 17 |

We claim:

1. An incipiently chlorinated copper phthalocyanine pigment having a chlorine content of from 10 to 40% by weight, and a dispersion harshness ≦10 in LDPE.

2. An incipiently chlorinated copper phthalocyanine pigment having a chlorine content of from 10 to 40% by weight, obtainable by isolating as a water-moist filter cake the crude pigment obtained in the chlorination of copper phthalocyanine, optionally drying the crude pigment, mixing the water-moist or dried crude pigment with an acidic aromatic organic medium and heating the mixture in a closed system to 140–200° C. at from 1 to 7 bar and subsequently isolating the treated pigment.

3. An incipiently chlorinated copper phthalocyanine pigment as claimed in claim 1, which has a chlorine content of from 10 to 30% by weight.

4. An incipiently chlorinated copper phthalocyanine pigment as claimed in claim 1, which has a chlorine content of from 10 to 20% by weight.

5. A process for preparing an incipiently chlorinated copper phthalocyanine pigment claimed in claim 1, which comprises isolating as a water-moist filter cake the crude pigment obtained in the chlorination of copper phthalocyanine, optionally drying this crude pigment, mixing the water-moist or dried crude pigment with an acidic aromatic organic medium and heating this mixture in a closed system to 140–200° C. at from 1 to 7 bar and subsequently isolating the treated pigment.

6. The process as claimed in claim 5, wherein the acidic aromatic organic medium is a compound of the general formula I

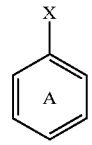

I where X is hydroxyl or carboxyl and the benzene ring A may additionally bear up to two identical or different substituents selected from the group consisting of nitro, C$_1$–C$_4$-alkyl, C$_2$–C$_4$-alkenyl, chlorine, bromine and carboxyl and may be benzofused.

7. The process as claimed in claim 5, wherein the acidic aromatic organic medium is 2-nitrophenol or 1- or 2-naphthol.

8. The process as claimed in claim 5, wherein the crude pigment is treated with the acidic aromatic organic medium at from 140 to 160° C.

9. The process as claimed in claim 5, wherein the crude pigment is treated with the acidic aromatic organic medium for from 1 to 12 h.

10. The process as claimed in claim 5, wherein the heating of the crude pigment in the acidic aromatic organic medium is effected in the presence of water.

11. The process claimed claim 5, wherein the treated pigment is subjected to an alkaline aftertreatment.

* * * * *